US006782164B1

(12) United States Patent
Lee et al.

(10) Patent No.: US 6,782,164 B1
(45) Date of Patent: Aug. 24, 2004

(54) THERMALLY WAVELENGTH TUNABLE LASER HAVING SELECTIVELY ACTIVATED GRATINGS

(75) Inventors: Shing Lee, Fremont, CA (US); David A. G. Deacon, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 10/062,956

(22) Filed: Jan. 31, 2002

(51) Int. Cl.[7] .............................. G02B 6/34; G02B 6/26; H01S 3/067
(52) U.S. Cl. ............................... 385/37; 372/6; 372/20; 385/39; 385/141
(58) Field of Search ........................... 385/37, 39, 141; 372/6, 20

(56) References Cited

U.S. PATENT DOCUMENTS

| | | | |
|---|---|---|---|
| 4,006,963 A | | 2/1977 | Baues et al. ............... 350/96 C |
| 5,182,665 A | | 1/1993 | O'Callaghan et al. ......... 359/95 |
| 5,504,772 A | | 4/1996 | Deacon et al. ............... 372/102 |
| 5,581,572 A | | 12/1996 | Delorme et al. .............. 372/50 |
| 5,732,102 A | | 3/1998 | Bouadma ..................... 372/96 |
| 5,914,972 A | * | 6/1999 | Siala et al. .................... 372/33 |
| 6,021,141 A | * | 2/2000 | Nam et al. .................... 372/20 |
| 6,459,533 B1 | * | 10/2002 | Clapp et al. ................. 359/578 |
| 6,591,038 B1 | * | 7/2003 | Pezeshki ...................... 385/37 |
| 2002/0191912 A1 | * | 12/2002 | Robinson et al. ............. 385/37 |
| 2002/0197013 A1 | * | 12/2002 | Liu et al. ...................... 385/37 |
| 2003/0039443 A1 | * | 2/2003 | Catchmark et al. ........... 385/37 |
| 2003/0067945 A1 | * | 4/2003 | Gao et al. ...................... 372/7 |

FOREIGN PATENT DOCUMENTS

GB 2286057 A 2/1995

OTHER PUBLICATIONS

P.J. Rigole et al., "State of the Art: Widely Tunable Lasers", *SPIE*, vol. 3001, pp. 382–393.
D.M. Adams et al., "Module–Packaged Tunable Laser and Wavelength Locker Delivering 40mW of Fibre–Coupled Power on 34 Channels", *Electronics Letters*, vol. 37, No. 11, May 24, 2001, pp. 691–693.
L. Eldada et al., "Thermally Tunable Polymer Bragg Grating OADM's", *OFC '99 100C*, Feb. 25, 1999, 4 pages.
S. Ura et al., "Electro–Optic Functional Waveguide Using New Polymer p–Nan–pVA for Integrated Photonic Devices", *J. Appl. Phys.*, vol. 31, 1992, pp. 1378–1381.
L. Eldada et al., "Thermo–Optically Active Polymeric Photonic Components", *OFC '2000 OFCC*, Mar. 8, 2000, 4 pages.
H–F. Liu et al., "Polymer Tunable Laser", *LEOS 2001*, Nov. 11–15, 2001, 5 pages.

* cited by examiner

*Primary Examiner*—John D. Lee
(74) *Attorney, Agent, or Firm*—Blakely, Sokoloff, Taylor & Zafman LLP

(57) ABSTRACT

A thermally wavelength tunable laser includes a core, the core including more than one diffraction grating, and thermo-optical material adjacent to each diffraction grating. By selectively changing the temperature and hence the refractive index in the thermo-optical material adjacent to a chosen diffraction grating, the chosen diffraction grating can be tuned over a selected wavelength range. By selecting different diffraction gratings, different, non-overlapping wavelength ranges can be selected and the laser can be tuned over a broad range of wavelengths.

36 Claims, 8 Drawing Sheets

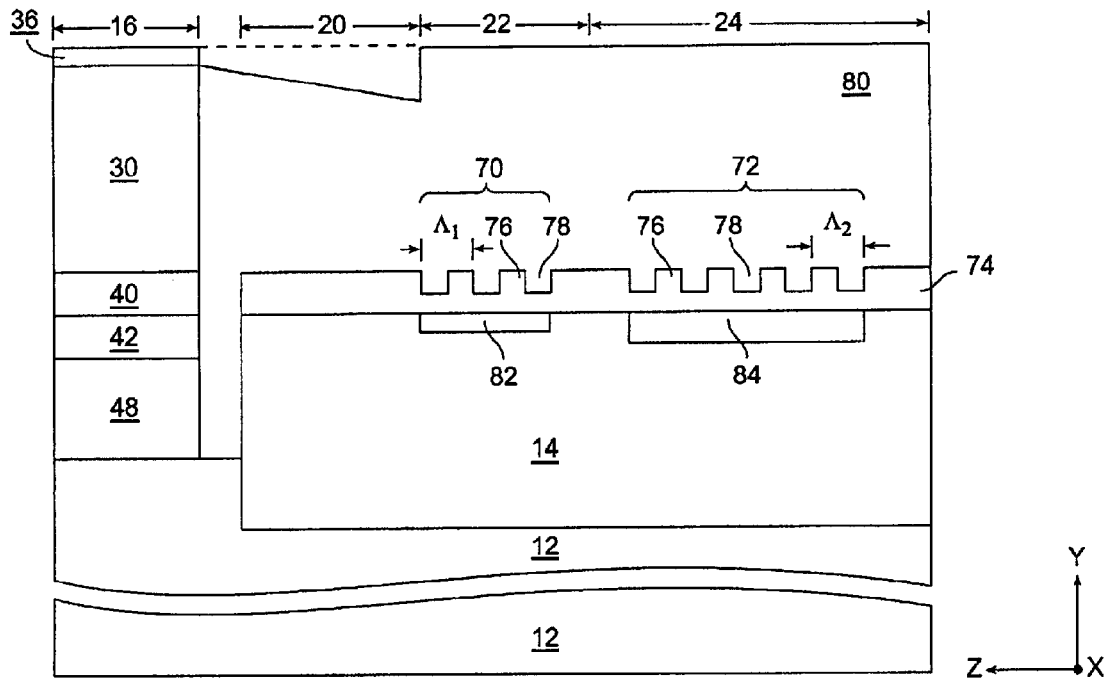
FIG. 1C(1)
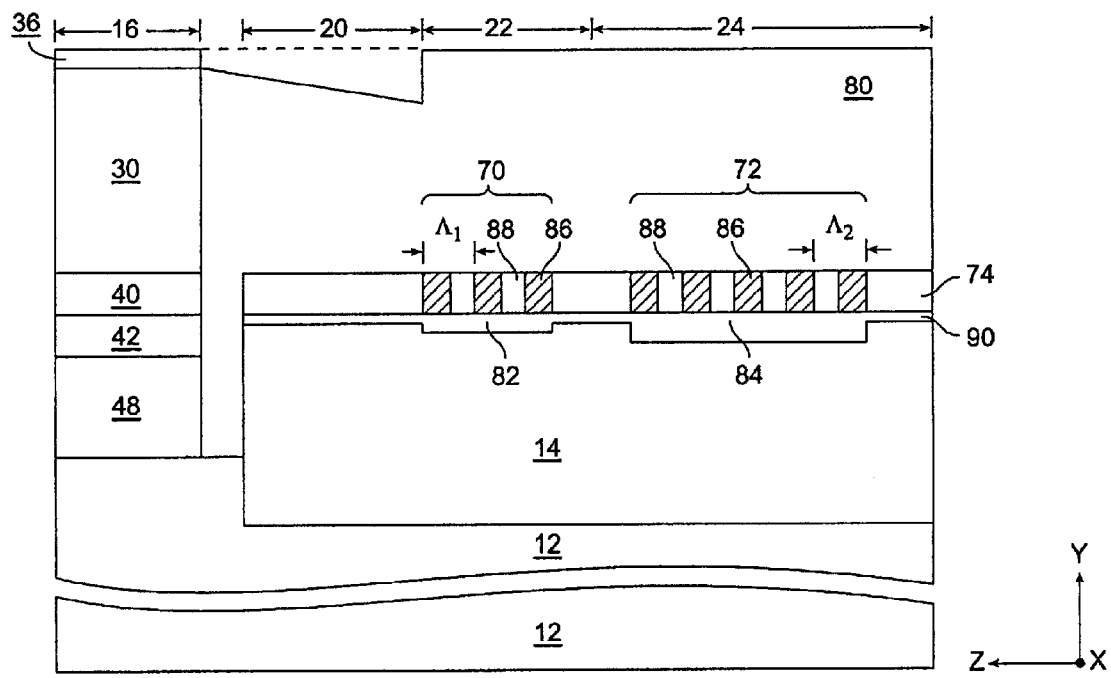
FIG. 1C(2)

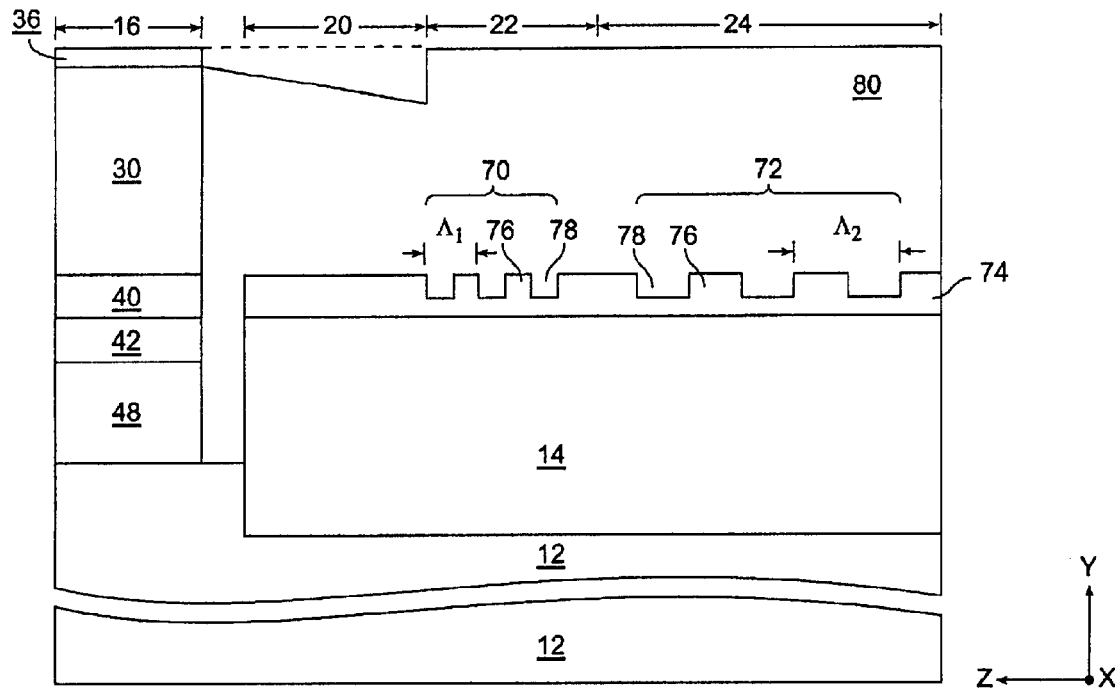
FIG. 1C(3)
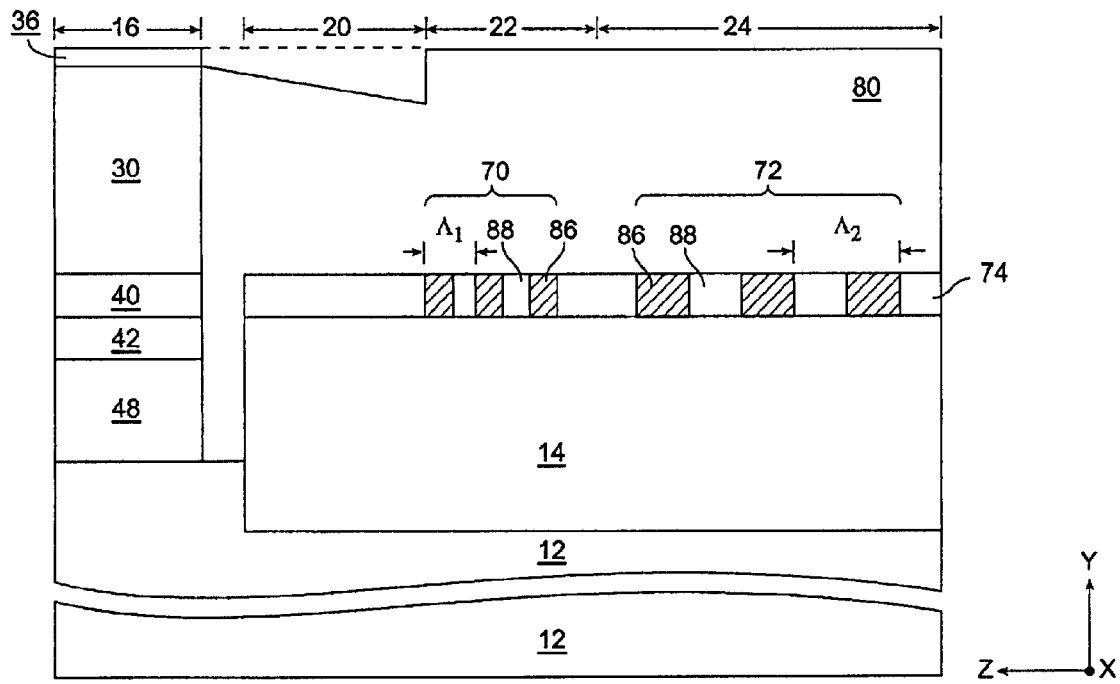
FIG. 1C(4)

THERMALLY WAVELENGTH TUNABLE LASER HAVING SELECTIVELY ACTIVATED GRATINGS

BACKGROUND OF THE INVENTION

1. Field of the Invention

This invention relates to the field of optical devices that manipulate light of tightly controlled wavelength, particularly for use in communication applications. More particularly, the invention relates to lasers that produce light of a specified wavelength and which can be tuned or switched to other specified wavelengths by thermal means.

2. Description of the Related Art

Over the past several years, there has been ever increasing interest in tunable lasers for use in optical communication systems, in general, and for use in dense wavelength division multiplexing (DWDM) applications, in particular. DWDM allows high bandwidth use of existing optical fibers, but requires components that have a broad tunable range and a high spectral selectivity. Such components should be able to access a large number of wavelengths within the S-band (1490–1525 nanometers), the C-band (1528–1563 nanometers), and the L-band (1570–1605 nanometers), each different wavelength separated from adjacent wavelengths by a frequency separation of 100 GHz, 50 GHz, or perhaps even 25 GHz, according to the system implementation.

The distributed Bragg reflector (DBR) laser was one of the first tunable lasers used in optical communication. The DBR laser consisted of a semiconductor amplifier medium, defining an active section, and an optical waveguide. The optical waveguide included a portion without a grating that defined a phase control section and a portion in which a single grating of typically constant pitch ($\Lambda$) was formed which constituted a distributed Bragg reflector or, more simply, the Bragg section, that reflected light at the Bragg wavelength $\lambda_B$. The optical waveguide was defined by an organic layer which constituted a core with another organic confinement layer disposed both above and below the core. Wavelength tuning of such a DBR laser was performed by either injecting current or transferring heat into the phase control section, the Bragg section, or both. Injecting current made it possible to vary the refractive index of the waveguide and thus control the Bragg wavelength $\lambda_B$ by the equation $\lambda_B=2n_{eff}\Lambda$ where $\Lambda$ is the pitch of the grating and $n_{eff}$ is the effective refractive index of the waveguide. Alternatively, a pair of heating resistance strips were disposed on opposite outer surfaces of the laser component at the phase control section, the Bragg section, or both. By independently controlling the voltages to the resistance strips, the temperature and hence the index of refraction of the organic layers that form the optical waveguide was controlled via the thermo-optical effect. The DBR laser was continuously tuned over a small wavelength tuning range of approximately 10 nanometers. For a more detailed discussion of a wavelength tunable DBR laser by heating, please refer to U.S. Pat. No. 5,732,102 by Bouadma entitled "Laser Component Having A Bragg Reflector of Organic Material, And Method of Making It" which is hereby incorporated by reference.

The DBR laser with selectively activated virtual diffraction gratings (Variation DBR Laser) was a variation of the DBR laser that employed current injection as the mechanism for wavelength tuning. The Variation DBR Laser replaced the single Bragg grating associated with a conventional DBR laser with a plurality of selectively activated virtual diffraction gratings. Specifically, the Variation DBR Laser included a plurality of periodic arrangements that constituted a plurality of virtual diffraction gratings. Each virtual diffraction grating had a different Bragg wavelength and hence a different wavelength tuning range. Injecting current into a first periodic arrangement created a first diffraction grating with a first Bragg wavelength which made it possible to vary the refractive index of the waveguide and wavelength tune the laser around the first Bragg wavelength. The switching of the injection current from the first periodic arrangement to a second periodic arrangement replaced the first diffraction grating with a second diffraction grating that had a second Bragg wavelength which made it possible to wavelength tune the laser over a range of wavelengths around the second Bragg wavelength. The Variation DBR Laser could be discontinuously tuned (in jumps) over a wavelength range several times the tuning range associated with the DBR laser. However, tuning by injection current had the disadvantage of increased optical cavity loss, increased optical noise, low output power, and the tradeoff between tuning and loss. For a more detailed discussion of a variation DBR by injection current, please refer to U.S. Pat. No. 5,581,572 by Delorme et al. entitled "Wavelength-Tunable, Distributed Bragg Reflector Laser Having Selectively Activated, Virtual Diffraction Grating." Further, for a discussion on tunable lasers in general, please refer to a paper by Rigole et al. entitled "State-of-the-art: Widely Tunable Lasers," SPIE, Vol. 3001, Pages 382–393, 1997. Both the Delorme patent and the Rigole paper are hereby incorporated by reference.

SUMMARY OF THE INVENTION

The present invention relates to a distributed Bragg reflector laser whose wavelength tuning range is comparable to that of the Variation DBR Laser but does not suffer the shortcomings associated with using injection current as the mechanism for wavelength tuning.

In the laser according to the invention, the mechanism for wavelength tuning is the changing of temperature and hence the refractive index of thermo-optical material adjacent to diffraction gratings. Thermo-optical material has a large dn/dt, that is, a change in temperature of the thermo-optical material will substantially change the refractive index of the thermo-optical material. Further, the thermo-optical material has a large dn/dt over a large temperature range which allows for a large potential tuning range.

According to the invention, changing the temperature of the thermo-optical material adjacent to a chosen diffraction grating changes the refractive index of the adjacent thermo-optical material. This changes the magnitude of the light reflected by the chosen diffraction grating at its Bragg wavelength. When the temperature of the thermo-optical material adjacent to a chosen diffraction grating is increased/decreased (depending on the composition of the thermo-optical material) beyond the off temperature, the magnitude of the light reflected by the chosen diffraction grating is sufficiently increased to cause single mode lasing of the laser. Independent of the chosen diffraction grating, the remaining diffraction gratings also reflect light at their respective Bragg wavelength. However, the cavity loss from these diffraction gratings is sufficiently high to cause degradation in the designated lasing mode in the laser.

Switching from a first to a second chosen diffraction grating requires changing the temperature of the thermo-optical material adjacent to the first diffraction grating back to temperatures greater than/less than (depending on the composition of the thermo-optical material) the off temperature and changing the temperature of the thermo-optical material adjacent to the second diffraction grating to a temperature less than/greater than(depending on the composition of the thermo-optical material) the off temperature.

Typically, the laser lases near the Bragg wavelength associated with the chosen diffraction grating. The Bragg wavelength associated with each diffraction grating differs from all others. The range of wavelength tuning associated with a given diffraction grating is such that there is a degree of overlap with any other wavelength tuning range of other diffraction grating. Thus, by properly modulating the lasing caused by each diffraction grating, the laser has a very large tuning range associated with the net wavelength coverage of all the grating tuning ranges.

In the laser according to this invention, the diffraction gratings are on a core of a waveguide or, alternatively, in the core of the waveguide. Each diffraction grating has a different Bragg wavelength. More specifically, a laser according to this invention includes a gain means with an active emission section which is optically coupled to a core of a waveguide and a substrate which supports both the gain means and the waveguide. More than one diffraction grating is disposed on the core or, alternatively, in the core. Thermo-optical material is adjacent to each diffraction grating and temperature changing means are disposed in the thermo-optical materials that are adjacent to each diffraction grating.

Between the gain means and the diffraction gratings along a diffraction grating free-portion of the core, there may be a phase control section which can slightly shift the cavity modes associated with the laser. Also, beneath the core and associated with each diffraction grating, the substrate may include index loading regions so that there is a different effective index of the optical mode for each diffraction grating when the period of all the diffraction gratings are the same.

The thermo-optical material of the tunable laser is preferably selected so as to have a high coefficient of variation in refractive index as a function of temperature, the magnitude of which should be preferably greater than $1 \times 10^{-4}/°$ C. Examples of thermo-optical material used in the laser and that exhibit these characteristics include polymers derived from methacrylate, siloxane, carbonate, styrene, cyclic olefin, or norbornene.

It should be observed that, except for the gain means, the laser is fabricated using Si processing technology and only the gain means is of GaAs, InP, InGaAsP, or other direct bandgap materials or gain mediums which requires complex and sensitive processing technology, such as epitaxial growth and cleaving. The gain means is independently fabricated with a minimum of structure. Accordingly, the laser is easy to manufacture, cost effective, and results in high yield.

BRIEF DESCRIPTION OF THE DRAWINGS

Other objects and advantages of the invention will become apparent upon reading the following detailed description and upon reference to the accompanying drawings in which:

FIG. 1C(1) is a first embodiment of a side elevational view along line 1C(1)—1C(1) in FIG. 1A;

FIG. 1C(2) is a second embodiment of a side elevational view along line 1C(2)—1C(2) in FIG. 1A;

FIG. 1C(3) is a third embodiment of a side elevational view along line 1C(3)—1C(3) in FIG. 1A;

FIG. 1C(4) is a forth embodiment of a side elevational view along line 1C(4)—1C(4) in FIG. 1A;

Figure 1A:
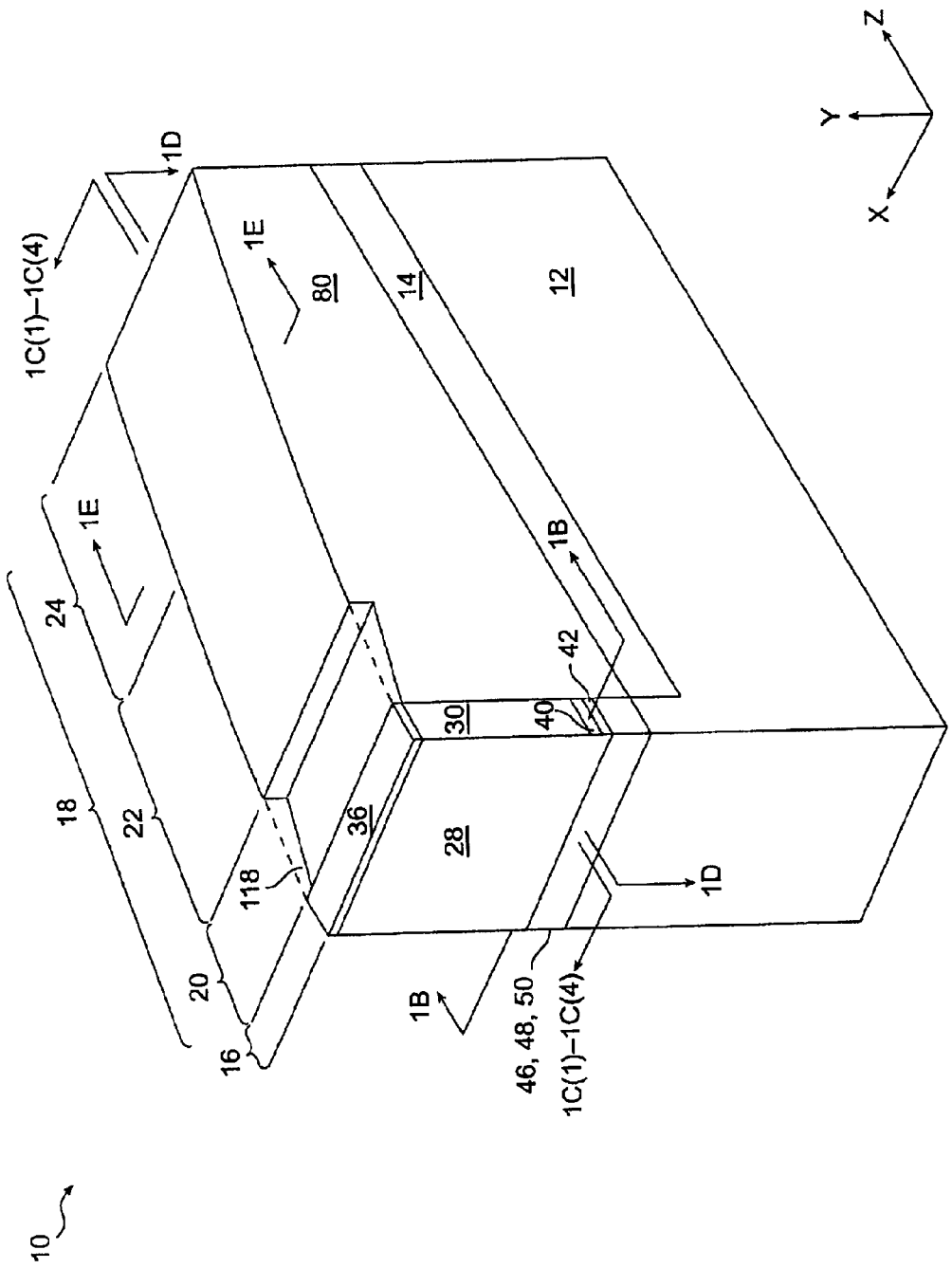
FIG. 1A is a right side elevational view of the laser according to principals of the invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

A laser according to the invention, and which is shown diagrammatically in FIG. 1, results from the modification of the Variation DBR Laser and the introduction of diffraction grating on or in a core of a waveguide, thermo-optical material adjacent to each diffraction grating, and temperature changing means within the thermo-optical material adjacent to each diffraction grating.

In order to increase the magnitude of the light reflected by a diffraction grating, use is made of changing the temperature and hence the refractive index of thermo-optical material adjacent to a chosen diffraction grating thereby decreasing the refractive index of the adjacent thermo-optical material. Thermo-optical material has a large dn/dt, that is, a change in temperature of the thermo-optical material will substantially change the refractive index of the thermo-optical material. Further, the thermo-optical material has a large dn/dt over a large temperature range which allows for a large potential tuning range associated with the net wavelength coverage of all the grating tuning ranges.

Typically, the laser lases near the Bragg wavelength associated with a single chosen diffraction grating while the remaining diffraction gratings also reflect light, but of a magnitude insufficient to cause lasing. When the temperature of the thermo-optical material adjacent to a chosen diffraction grating is increased/decreased (depending on the composition of the thermo-optical material) beyond the off temperature, the magnitude of the light reflected by the chosen diffraction grating is sufficiently increased to cause single mode lasing of the laser. Independent of the chosen diffraction grating, the remaining diffraction gratings also reflect light at their respective Bragg wavelength. However, the cavity loss from these diffraction gratings is sufficiently high to cause degradation in the designated lasing mode in the laser. Note that the refractive index of a material is also known as the index of refraction of the material.

Switching from a first to a second chosen diffraction grating requires changing the temperature of the thermo-optical material adjacent to the first diffraction grating back to temperatures greater than/less than (depending on the composition of the thermo-optical material) the off temperature and changing the temperature of the thermo-optical material adjacent to the second diffraction grating to a temperature less than/greater than (depending on the composition of the thermo-optical material) the off temperature.

Referring now to FIG. 1A, there is shown an embodiment of the laser 10 that is highly wavelength tunable and has high spectral selectivity. On a substrate 12 which supports a cladding layer 14, the laser 10 includes a gain means 16 which provides light and a passive section 1B which processes the light received from the gain means 16. The passive section 18 includes a phase control section 20 and more the than one diffraction grating sections. In FIG. 1A, the laser 10 includes a first and a second diffraction grating sections 22 and 24, respectively. The number of diffraction grating sections depends on the design of the laser and usually will be greater than two.

Most generally, the gain means 16 provides sufficient optical gain to overcome the losses associated with the laser 10 and to create oscillation within the laser 10. The gain means 16 includes a first facet 26 (FIG. 1D) and a second facet 28. The second facet 28, most preferably, has a highly reflective (HR) coating thereon, but may also have a partially reflective and partially transmissive coating thereon, depending on whether light will be outputted from this facet.

Figure 1B:
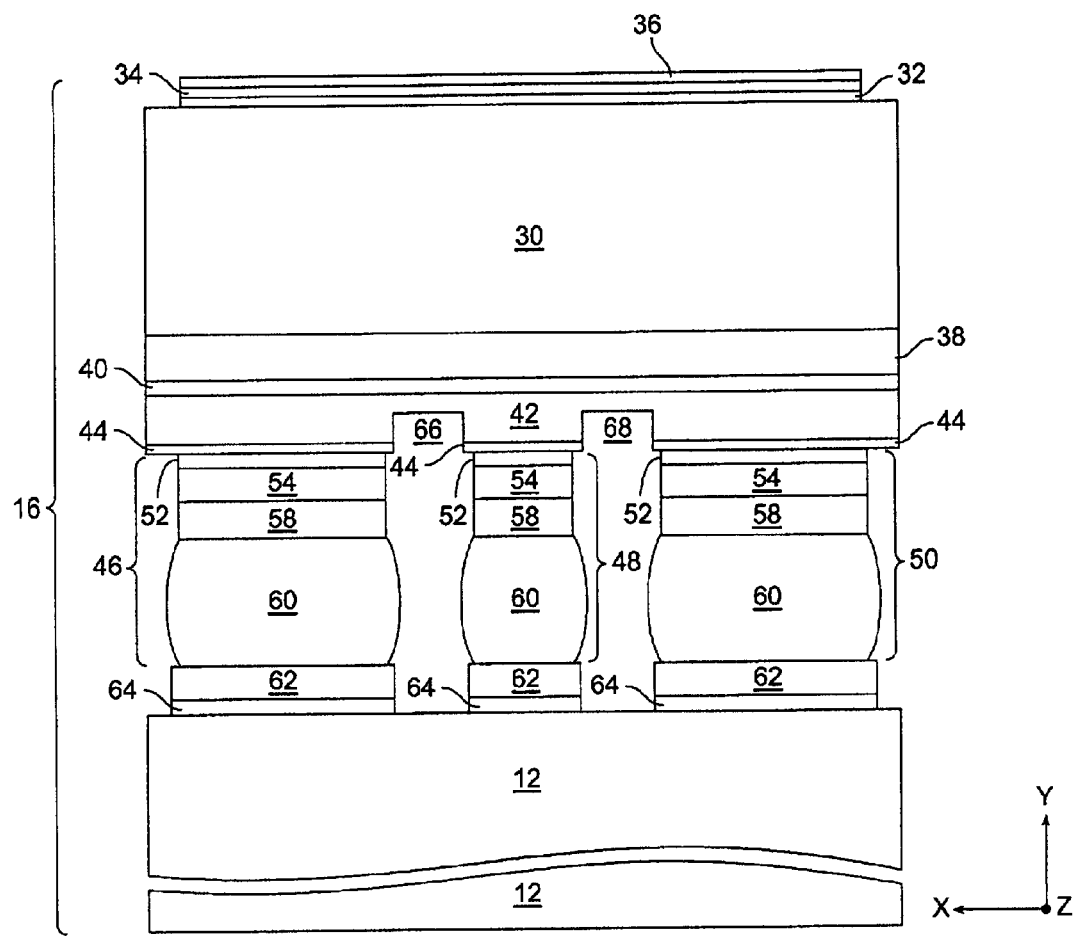
FIG. 1B is a detailed front view of the laser diode along the line 1B—1B shown in FIG. 1A.

Referring now to FIG. 1B, the gain means 16 has been flipped over and flip chip bonded to the cladding layer 14. The gain means 16 is a solid-state laser which is preferably a semiconductor diode laser. The gain means 16 may be a ridge laser or a buried hetro-structure with or without multiple quantum wells. As shown, the gain means 16 is a ridge laser that is preferably fabricated on InP so as to emit in the 1550 nm region or the 1310 nm region. Alternatively, the gain means 16 may be fabricated on other convenient substrates such as sapphire or gallium arsenide. The gain means 16 includes a substrate 30 of n-type InP and sequentially deposited on a major surface of the substrate 30 is an adhesion layer 32 typically formed of titanium, a diffusion barrier layer 34 typically formed of platinum, and a bonding layer 36 typically formed of gold. A first clad layer 38 is formed on the other major surface of the substrate 30. An active emission layer 40 of a semiconductor material, such as InGaAsP or InGaAlP that preferably includes strained quantum wells, is formed on a major surface of the first clad layer 38 and provides the optical gain of the laser 10. The dimensions of the active emission layer 40 are variable, but may typically be a fraction of a micron in the y direction (thickness) and at least a couple of microns in the x direction (width). The light produced by the active emission layer 40 is typically a single mode with a mode size at full width half maximum (FWHM) of approximately 0.6 microns in the y direction (height) and approximately 3 microns in the x direction (width). A second clad layer 42 is disposed on the other major surface of the active emission layer 40. Both clad layers 38 and 42 are formed of a lower refractive index semiconductor material than the active emission layer 40. On the surface of the second clad layer 42, a contact layer 44 which provides low electrical resistance is grown. All of these layers may be structured into sublayers as is known in the art.

A plurality of solder balls 46, 48, and 50 connect the gain means 16 to the substrate 12. Each solder ball includes a first adhesion layer 52 typically formed of titanium, a diffusion barrier layer 54 typically formed of platinum, a bonding layer 58 typically formed of gold, a solder ball 60 typically formed of 80% gold and 20% tin, a bonding layer 62 typically formed of gold, and a second adhesion layer 64 typically formed of chromium. Many alternative solder, barrier, adhesion, and dewetting materials may also be used, to enable processing at different temperatures, as may be alternative metal layers. An external electrical contact (not shown) exists on the bonding layer 36 and the bonding layer 62 of the central solder ball 48 thereby enabling the active emission layer 40 to be fed with amplification current in the region of the optical mode. Trenches 66 and 68 are etched through the contact layer 44 and through most of the cap layer 42 on both sides of the central solder ball 48 which effectively bounds most of the generated light to the active emission layer 40 between the trenches 66 and 68.

During operation, the gain means 16 generates several hundred milli-watts of thermal power, the majority of which is generated in the active emission layer 40 between the trenches 66 and 68, and this thermal power is dissipated through an efficient thermal flow through and beneath the gain means 16. Thermal power generated in the active emission layer 40 is dissipated through the plurality of solder balls 46, 48, and 50, and into the substrate 12 that is typically formed of silicon, but may be also formed of sapphire, gallium arsenide, indium phosphide, metal, glass, or ceramic. The substrate 12 is substantially thicker than the cladding layer 14 and acts as a heat reservoir for the tunable laser by maintaining a relatively constant temperature with a low thermal gradient. Preferably, the rise above ambient temperature in the gain means 16 is kept beneath 50° C. and, more preferably, beneath 10° C. A single or a plurality of heat sinks (not shown) may be disposed beneath the substrate 12 in order to aid in dissipating thermal power from, most importantly, the gain means 16, but also from the passive section 18, as the substrate 12 are common to the gain means 16 and the passive section 18. A thermal sensor (not shown) may also be disposed near the gain means 16 to control the heat sinks (not shown) and to thereby regulate the temperature in the gain means 16 and the substrate 12.

Each diffraction grating section 22 and 24 has a diffraction grating disposed within the laser 10. Four (4) different embodiments of a first and a second diffraction grating 70 and 72 associated with the first and the second diffraction grating section 22 and 24, respectively, are shown in FIGS. 1C(1)–1C(4). Each embodiment of the diffraction gratings discussed below is in or on a core 74, and has a respective period which is designated $\Lambda_1$ and $\Lambda_2$, respectively.

Referring now to FIG. 1C(1), each diffraction grating 70 and 72 has zones 76 etched into the top of the core 74. The zones 76 alternate with zones 78 made from a thermo-optical material 80, discussed more fully below. The period $\Lambda_1$ and $\Lambda_2$ associated with each diffraction grating 70 and 72 are the same. Below each diffraction grating 70 and 72, the cladding layer 14 includes index loading regions 82 and 84 of different refractive indexes which may be formed by differential doping, thermal, or other processes. Thus, at a given reference temperature, as an optical mode propagates past each diffraction grating 70 and 72 and each corresponding index loading region 82 and 84, there is a different effective index of the mode. Further, although not shown, it is within the scope of this invention that the zones 76 may be formed on the top, bottom, or the sides of the core 74.

Referring now to FIG. 1C(2), each diffraction grating 70 and 72 has written zones 86 formed in the core 74. The written zones 86 alternate with non written zones 88. The period $\Lambda_1$ and $\Lambda_2$ associated with each diffraction grating 70 and 72 are the same. A layer 90 includes index loading regions 86 and 88 of the same refractive index but different thicknesses. Thus, at a given reference temperature, as an optical mode propagates past each diffraction grating 70 and 72 and each corresponding index loading region 86 and 88, there is a different effective index of the mode.

Referring now to FIG. 1C(3), each diffraction grating 70 and 72 has zones 76 etched onto the top of the core 74. The zones 76 alternate with zones 78 made from a thermo-optical material 80, discussed more fully below. The period $\Lambda_1$ and $\Lambda_2$ associated with each diffraction grating 70 and 72 differ. Further, although not shown, it is within the scope of this invention that the zones 76 may be formed on the top, bottom, or the sides of the core 74.

Referring now to FIG. 1C(4), the preferred embodiment of the first and the second diffraction gratings 70 and 72 is shown. Specifically, each diffraction grating 70 and 72 has written zones 86 formed in the core 74. The written zones 86 alternate with non written zones 88. The period $\Lambda_1$ and $\Lambda_2$ associated with each diffraction grating 70 and 72 differ. The preferred embodiment of the first and the second diffraction gratings 70 and 72, namely, FIG. 1C(4), shall be used in the discussions below.

In the preferred embodiment, the laser 10 will lase at a single mode when the temperature of the thermo-optical material adjacent to a chosen diffraction grating is increased/decreased (depending on the composition of the thermo-optical material) beyond the off temperature. The off temperature has a tolerance of several degrees Celsius and a range from approximately −65° Celsius to 100° Celsius. In the preferred embodiment, the off temperature corresponds to a temperature that is either higher than or lower than the temperature of the substrate 12 when the heat sinks (not shown) are on. Also, as portions of the thermo-optical material 80 adjacent to the core 74 and along the z-axis are heated while other portions remain at room temperature, the size and shape of the optical mode along the z direction of the core 74 changes, but the change is preferably gradual, adiabatic, and therefore with minimal optical loss.

Each diffraction grating has a pitch spacing ($\Lambda$). The pitch spacing ($\Lambda$) can vary in the range between about 0.1 to about 10 $\mu$m. More preferably, the diffraction grating is a Bragg grating with an associated Bragg wavelength ($\lambda_B$). The Bragg wavelength is linked to the effective index ($n_{eff}$) of the waveguide, defined below, and the pitch spacing ($\Lambda$) of the correspondingly activated diffraction grating by the following formula:

$$\lambda_B(i) = 2n_{eff}(i)\Lambda(i)$$

In this formula, the index (i) assumes one of the values of the chosen diffraction grating. In FIG. 1, the index (i) can be 1 or 2 which correspond to the first or second periodic arrangements 70 and 72.

Bragg wavelengths of the different periodic arrangements are spread out to cover a wide wavelength range. One can change the grating pitch and/or the effective index of the waveguide. One way to increase the effective index in the waveguide is to put in the index loaded region by introducing impurity near the waveguide core, FIGS. 1C(1) and 1C(2). One of advantages of this. approach is to achieve different Bragg wavelengths for different periodic arrangement using the same grating pitch which would simplify the grating making processes.

Figure 1D:
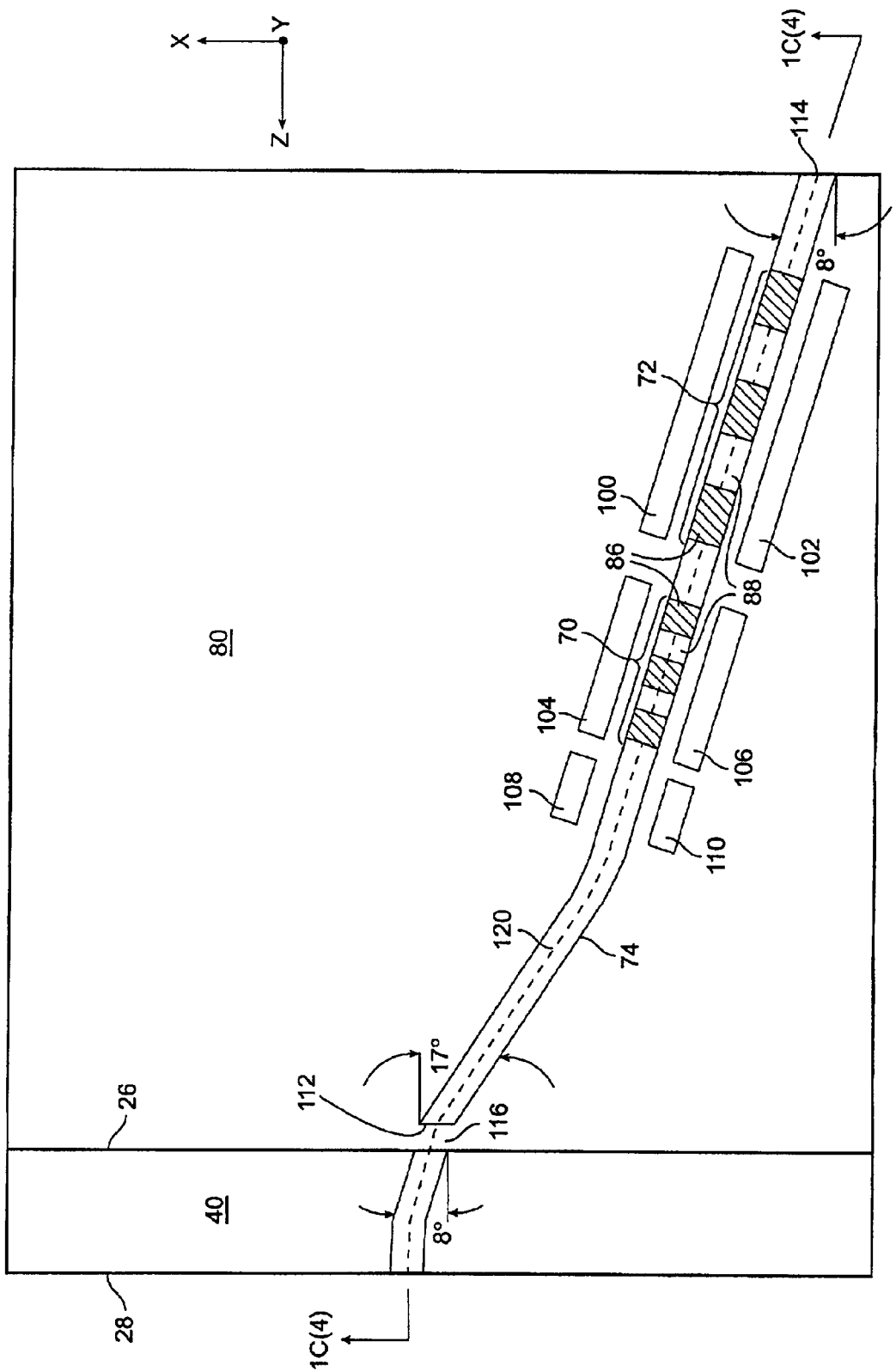
FIG. 1D is a top view of the fourth embodiment shown in FIG. 1C(4)
Figure 1E:
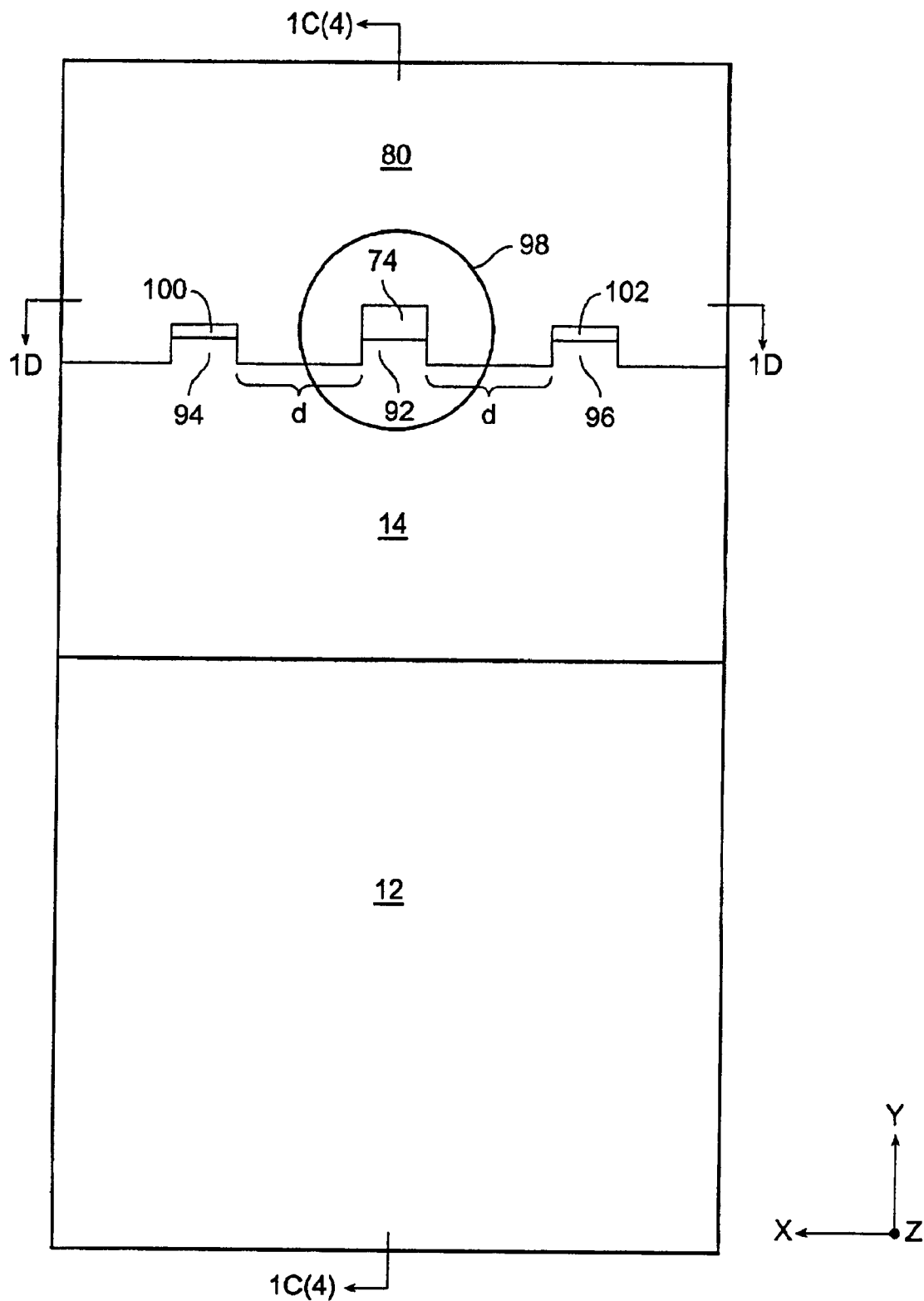
FIG. 1E is a front view of the heaters and the waveguide along the line 1E—1E in FIG. 1A and associated with the forth embodiment shown in FIGS. 1C(4) and 1D.

Referring now to FIGS. 1D and 1E, the temperature changing means associated with the first and the second diffraction gratings 70 and 72 and the phase control section 20 are shown. Specifically, referring to FIG. 1E, the cladding layer 14 is etched to produce pedestal regions 92, 94, and 96. The depth of the pedestal 92, 94, and 96 may vary from about 0 to 10 microns. A silicon nitride ($Si_3N_4$) layer is deposited on the pedestal region 92 and defines the core 74. The written zones 86 (FIG. 1C(4)) may be formed in the core 74 by, for example, photorefractive inscription in the core 74 which comprises irradiating the top portion of the core 74 by a system of interference fringes or else by photochemical writing using a laser. The core 74 can also be doped silica with germanium, nitrogen, lead, tin, phosphorous, boron, or combinations thereof. A waveguide 98 includes the core 74, portions of the thermo-optical material 80 adjacent to the core 74, and portions of the cladding layer 14 beneath the core 74. The diameter of the waveguide 98 encompasses most of the optical mode.

Heaters 100 and 102 are disposed upon pedestal regions 94 and 96 which are disposed on both sides of the second diffraction grating 72 (FIG. 1D). The length of the heaters 100 and 102 exceed the length of the second diffraction grating 72 or are otherwise designated so that the entire length of the second diffraction grating 72 can be maintained at a uniform temperature. The heaters 100 and 102 are chromium (Cr) in this embodiment, but may be of any conductive material including NiCr, Ti and W. Electrical contacts and wires (both not shown) are provided to apply a potential to or for passing current through each heater. The total distance from the heaters 100 and 102 to the core 74 is the distance (d). The distance (d) is chosen so that (a) the optical mode experiences minimal absorption loss caused by the material of the heaters and (b) the temperature of the thermo-optical material 80 adjacent to the core 74 can be quickly and efficiently changed. The heaters shown in FIG. 1 are resistive heaters, but this invention contemplates the use of thermoelectric heaters or coolers that employ the Peltier effect. The first diffraction grating 70 and the phase control section 20 also have the same pedestal and heater structure as that shown in FIG. 1E. As shown in FIG. 1D, a pair of heaters 104 and 106 are disposed on both sides of the first diffraction grating 70 and a pair of heaters 108 and 110 are disposed on both sides of the phase control section 20. The length of the heaters 104 and 108 exceeds the length of the first diffraction grating 70 or are otherwise designated so that the entire length of the first diffraction grating 70 can be maintained at a uniform temperature. The pair of heaters 114 and 116 are also adjacent to a diffraction grating free portion of the core 74. It is also within the scope of this invention to replace the pair of heaters around individual optical elements with a single pair of heaters around groups of two or more optical elements. It is also within the scope of this invention to located the heaters in other structures near the core 74 such as above or within the thermo-optical material 80 or the cladding layer 14.

Referring now to FIG. 1D, the core 74 is optically coupled to the active emission section 40. Specifically, the core 74 includes a first end 112 which is aligned with that portion of the active emission section 40 that is between the trenches 66 and 68. The core 74 also includes a second end 114 which may preferably have either an AR coating or a partially reflective and partially transmissive coating, depending on whether light exits the laser 10 via the second end 114. Most preferably, the active emission layer 40 between the trenches 66 and 68 is aligned with the first end 112 along the y (thickness) and x (width) directions and a gap 116 between the first facet 26 and the first end 112 is minimized in order to minimize the divergence of the light as the light propagates between the first facet 26 and the first end 112 and to maximize the light coupled from the active emission section 40 to the core 74, as much as possible, without introducing any parasitic reflections. Further, in the preferred embodiment, the gain means 16 and the core 74 are designed so that the size of the optical mode propagating from the active emission layer 40 into and then along the core 74 remains approximately constant and with minimal optical loss. Alternatively, a taper (not shown) can be formed adjacent the core 74 and a surface of the taper can be aligned with that portion of the active emission layer 40 that is between the trenches 66 and 68 so as to couple as much of the light produced by the active emission layer 40 as possible into the core 74. As a second alternative, the taper (not shown) can be directly incorporated into the gain means 16, rather than into the core 74.

The thermo-optical material 80 is applied onto and over the heaters 100, 102, 104, 106, 108, and 110, the core 74 containing the first and second diffraction gratings 70 and 72, and onto the cladding layer 14 to provide coverage without incorporating voids or bubbles. The thermo-optical material 80 may also be configured to fill the gap 116 between the first facet 26 and the first end 112, providing an advantageous index matching effect. To enable electrical connection to the n-contact 36 (FIG. 1A), a portion of the thermo-optical material 80 is removed, preferably by reactive ion etching through a lithographically patterned mask, from a region above the gain means 16 which leaves a slot 118 (FIG. 1A).

The thermo-optical material 80 has a large dn/dt, that is, a local change in temperature of the thermo-optical material will substantially change the local refractive index of the thermo-optical material. Typically, the thermo-optical material 80 has a high coefficient of variation in its' refractive index as a function of temperature, the magnitude of which is preferably greater than $1 \times 10^{-4}/°$ C. Further, the thermo-optical material 80 has a large dn/dt over a large temperature range which allows for a large potential tuning range. Specific materials may be selected for the thermo-optical material include, but are not limited to, methacrylates, siloxanes, carbonates, styrenes, cyclic olefins, and norbornenes. It is useful to adjust the index of refraction of these materials by fluorination (replacing hydrogen molecules with fluorine molecules in the molecular formula of some of the polymer repeat units) as this has the added benefit of reducing the optical loss in the infrared region. Many of these materials meet the optical specifications for the thermo-optical material 80. A specific material may be chosen according to an optimization process of the secondary characteristics such as minimizing birefringence, residual stress, and chemical reactivity, while maximizing wetting, adhesion, working lifetime, and thermal resistance. The thickness of the thermo-optical material 80 is chosen such that the thermo-optical material-air interface adds only minimal and preferably no optical loss to the optical performance of the laser 10.

Referring again to FIG. 1D, the optical path of the laser 10 is shown. In FIG. 1, light propagates along the active emission layer 40 between the trenches 66 and 68 and the core 74 which collectively define an optical axis 120 within the laser 10. The optical axis 120 is angled near the first facet 26 and near the second end 114 so that the optical axis 120 traverses the intracavity and extracavity interfaces at a non-normal angle so as to prevent parasitic reflections from degrading the performance of the laser 10. The optical axis 120 is curved within the active emission layer 40 so that the second facet 28 forms one end and the diffraction gratings 70 and 72 (FIG. 1C(4)) form the other end of the laser cavity associated with the laser 10. In order for the laser 10 to lase, the gain associated with active emission layer 40 must be greater than losses associated with the gain means and the laser cavity. The losses associated with the laser cavity include, but are not limited to: the coupling losses between the first facet 26 and the first end 112, the losses propagating through the thermo-optical material 80 and the waveguide 104, the reflection losses associated with the diffraction gratings 70 and 72, the reflections at the interfaces 26 and 112, and any other parasitic reflections. Each loss element in the laser cavity shown should be no larger than a few decibels (dB) and preferably smaller than 0.5 dB so that the collective single pass loss along the optical axis 120 of the laser cavity is no larger than about 5 to 20 decibels.

The dynamic operation of the laser 10 shown in FIG. 1 shall now be discussed. Amplification current supplied to the bonding layer 36 (FIG. 1B) and the portion of the bonding layer 62 (FIG. 1B) in electrical contact with active layer 40 (FIG. 1B) between the trenches 66 and 68 (FIG. 1B) causes gain in the active layer 40 and light to propagate through the gap 116 and into the core 74.

In the general case, the threshold gain of the laser 10 is related to the reflectivity of the diffraction gratings and related to the gain band of the material. However, under certain situations, the gain band of the material is wide when compared to the tuning range of the laser and such is the case for the laser 10. Accordingly, in this description, the threshold gain of the laser 10 is related to the reflectivity of the diffraction gratings without considering the effects of the gain band of the material.

Figure 2A:
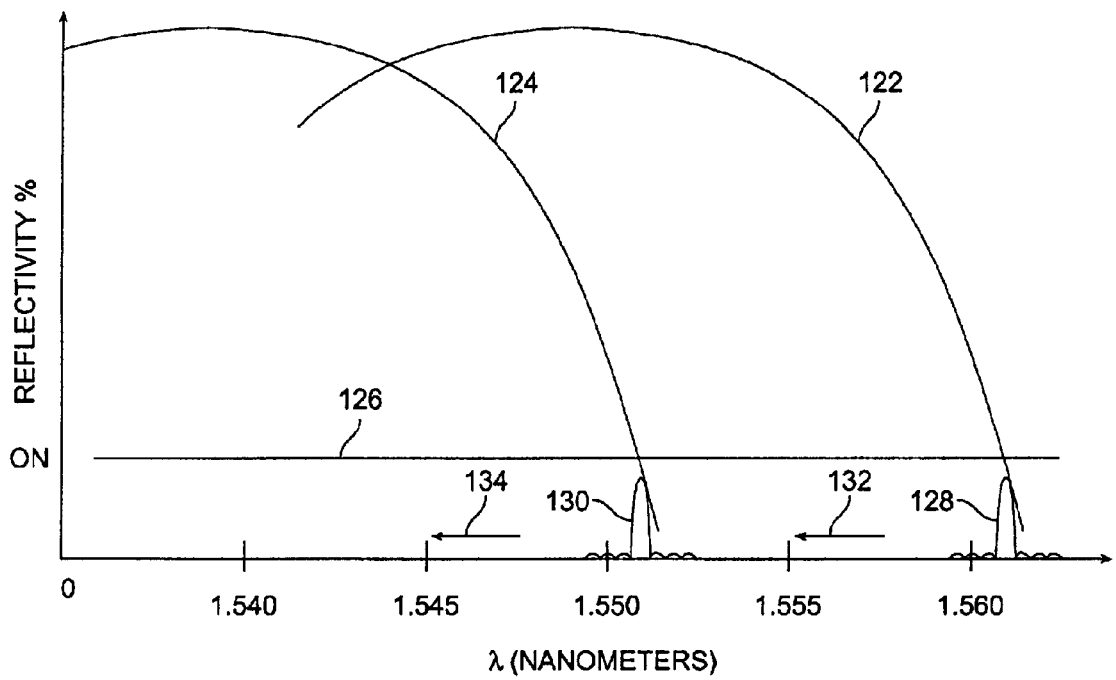
FIG. 2A is diagrammatic representations of a reflection spectrum associated with a first and a second diffraction grating of the fourth embodiment.
Figure 2B:
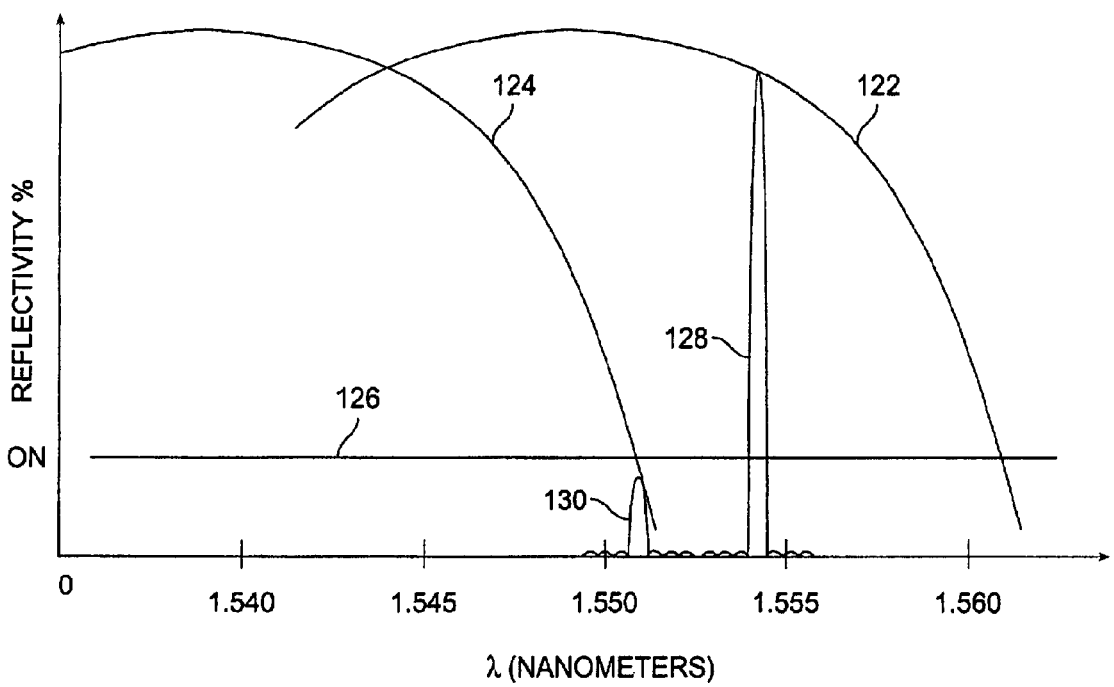
FIGS. 2B and 2C are diagrammatic representation of the reflection spectrums shown in FIG. 2A wherein first diffraction grating is under the influence of thermal tuning.
Figure 2C:
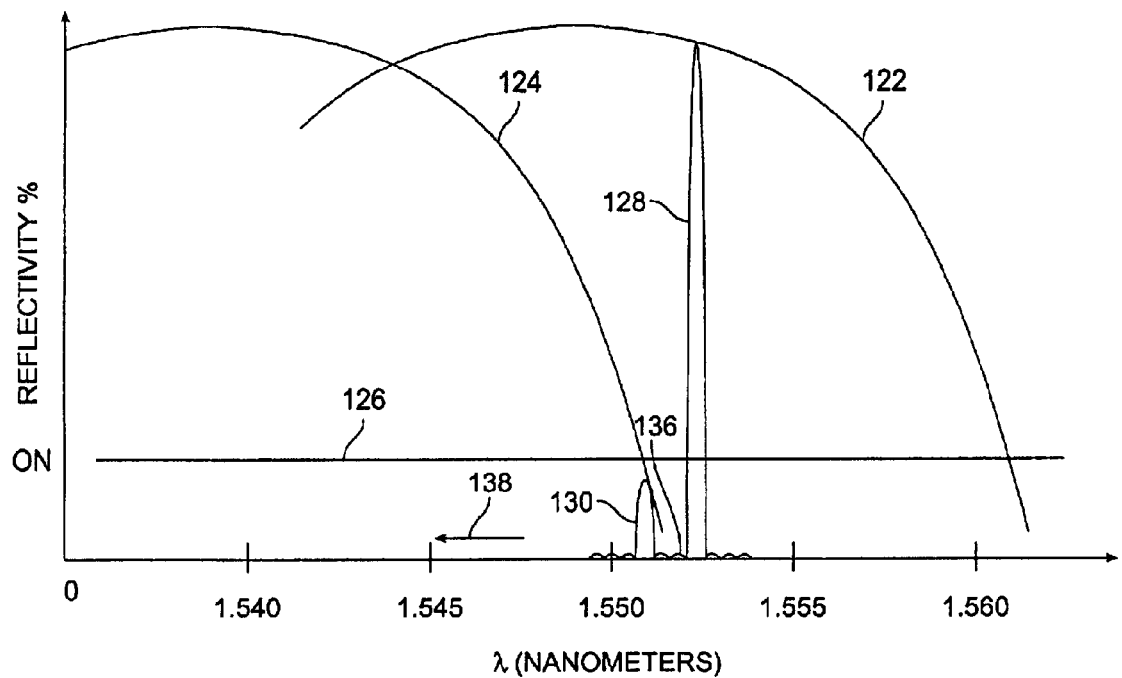

As shown in FIG. 2A, both diffraction gratings 70 and 72 are Bragg gratings. Each Bragg grating reflects light of particular wavelengths and the degree to which each Bragg grating reflects light is represented by a reflection curve, namely, reflection curve 122 for the Bragg grating associated with the first diffraction grating 70 and reflection curve 124 for the Bragg grating associated with the second diffraction grating 72. The shape, the tuning range, and the existence of a reflection curve being dependent on the specific waveguide design that will allow a sufficient side mode suppression ration (SMSR) near the on temperature to allow for a sufficiently pure single mode laser (here, SMSR>35 dB). The reflectivity level of each Bragg grating that will cause lasing in the laser 10 is shown in FIGS. 2A, 2B, and 2C as an on state 126. At reflectivity levels less than the on state 126, the laser 10 will not lase while, at reflectivity levels equal to or greater than on state 126, the laser 10 will lase. In FIG. 2A, reflection peaks 128 and 130 associated with the first and the second Bragg gratings 70 and 72, respectively, are shown and correspond to when the heaters 100, 102, 104, and 106 are off and not generating heat and both diffraction gratings 70 and 72 and the thermo-optical material 80 adjacent to both diffraction gratings are at the temperature of the substrate 12. As can be seen from FIG. 2A, the reflectivity level associated with the reflection peaks 128 and 130 are less than the on state 126 which indicates that the laser 10 is not lasing at a single mode.

One way to write a grating on the core is to etch a shallow grating on the core as shown in FIGS. 1C(1) and 1C(2). When the thermal optical material is applied as the cladding, one can obtained thermal tuning in Bragg wavelength and grating strength. When the index of thermal w optic material increases (decreases), it draws the optical mode to the top (bottom) cladding. The effective index of the waveguide and hence the Bragg wavelength increases (decreases). The strength of the gratings is proportional to the index contrast between the core and the thermal optical material and the optical energy overlapping the grating region. The index of the thermal optic material must be less than the core index in order for the waveguide to function. As the index of the thermal optic material changes, the optical mode-grating overlap factor and the contrast changes accordingly. One need to design a waveguide so that the grating strength would vary across over the tuning region to provide enough mode discrimination to turn the grating on and off with respect to all other periodic arrangements.

In general, as the temperature in the thermo-optical material adjacent to a chosen diffraction grating increases or decreases (depending on the composition of the thermo-optical material) beyond the off temperature, the refractive index of the thermo-optical material adjacent to the chosen diffraction grating decreases which also shifts the Bragg wavelength. More specifically, thermo-optical material exists which has a large positive or negative dn/dt in response to either cooling or heating of the thermo-optical material. In FIGS. 1 and 2, the thermo-optical material 80 has a negative dn/dt in response to increases in temperature, that is, as the temperature of the thermo-optical material 80 increases, the refractive index of the thermo-optical material 80 decreases.

With the heaters 104 and 106 turned on and generating heat, the temperature of the thermo-optical material 80 adjacent to the first diffraction grating 70 increases. As the temperature in the adjacent thermo-optical material 80 continues to increase, the refractive index of the thermo-optical material adjacent to the first diffraction grating 70 continues to decrease. This changes the refractive index of the adjacent thermo-optical material which changes the reflectivity of the first Bragg grating 70 and also shifts the Bragg wavelength associated with the first Bragg grating. An arrow 132 indicates the direction in which the reflection peak 128 moves in response to increases in the temperature of the adjacent thermo-optical material 80 caused by the heaters 104 and 106. In the current industry jargon, the first Bragg grating 70 is "strengthened" as the reflection peak moves in the direction indicated by the arrow 132 towards maximum reflectivity, as shown in FIG. 2B. As shown in FIG. 2B, the reflection peak 128 is greater than the on state 126 which indicates that the laser is lasing at a single mode.

The heaters 104 and 106 continue to increase the temperature in the thermo-optical material 80 adjacent to the first Bragg grating 70 which shifts the reflection peak 128 further towards the reflection peak 130, as shown in FIG. 2C. When the side lobes 136 associated with the reflection peak 130 overlaps with the reflection peak 128, the resultant parasitic reflection interferes with and degrades the performance of the laser 10. To prevent such an event, the heaters 100 and 102 associated with the second diffraction grating 72 are turned on so that the temperature of the adjacent thermo-optical material 80 is heated and the reflection peak 130 moves in the direction indicated by the arrow 138 whenever either condition below is met. The reflection peak 130 is moved in the direction indicated by the arrow 138 whenever (a) the parasitic reflection associated with the side lobes 136 is greater than one-hundredth of one percent of the reflectivity associated with the reflection peak 122 at the cavity mode (not shown) at which the laser 10 is lasing or (b) the difference in the threshold gain between reflection peaks 128 and 130 divided by the threshold gain of reflection peak 128 is greater than a certain margin to give a sufficiently pure single mode laser (here, >35 dB SMSR).

As shown in FIG. 2C, with the reflection peak 128 associated with the first Bragg grating 70 greater than the on state 126, the laser 10 can be tuned to and hence lase at any cavity mode (not shown) located between 1550 and 1560 nanometers. Further, if necessary, these cavity modes (not shown) can be slightly shifted by the use of the heaters 108 and 110 in the phase control section 20 to align a given cavity mode with the reflection peak 128.

Figure 2D:
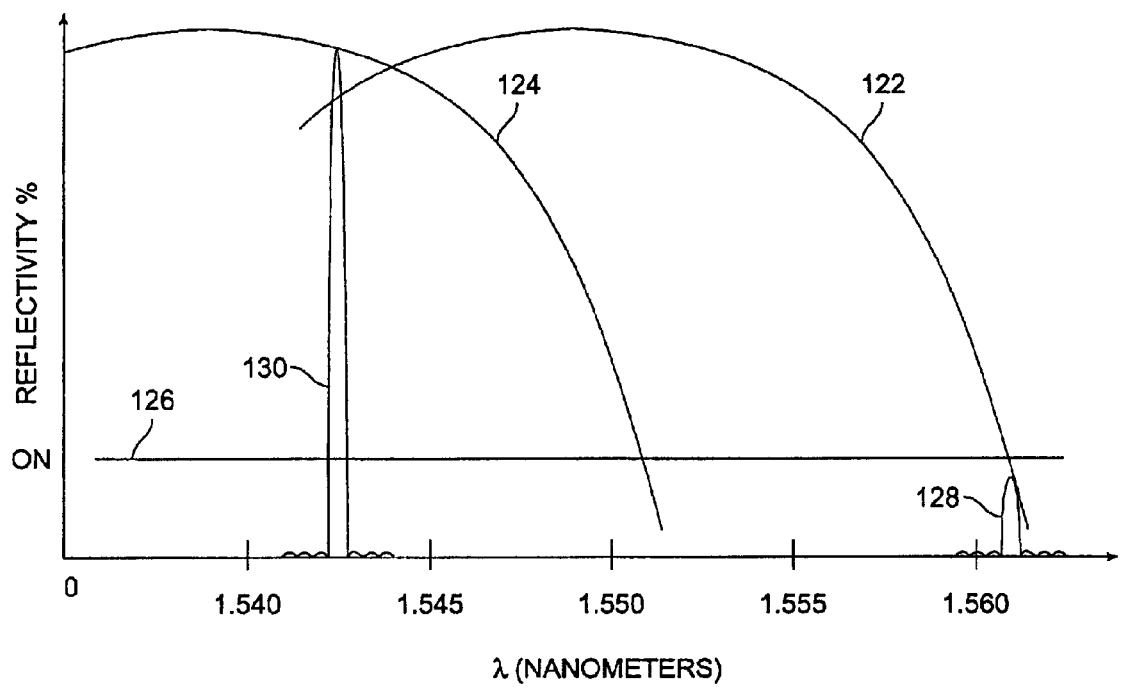
FIG. 2D is a diagrammatic representation of the reflection spectrum associated with the first and the second diffraction gratings wherein the second diffraction grating is under the influence of thermal tuning.

The heaters 104 and 106 are now turned off so that the temperature of the thermo-optical material 80 adjacent to the first diffraction grating 70 returns to the temperature of the substrate 12. This causes the refractive index of the thermo-optical material 80 adjacent to the first diffraction grating 70 to increase which causes the reflection peak 128 to move back in a direction opposite to the arrow 132 and to fall below the on state 126, as shown in FIG. 2D. Corresponding with the heaters 104 and 106 being turned off, the heaters 100 and 102 disposed on both sides of the second diffraction grating 72 are turned on and start to generate heat. In response, the temperature of the thermo-optical material 80 adjacent to the second diffraction grating 72 increases and the refractive index of the thermo-optical material 80 adjacent to the second diffraction grating 72 decreases. As shown in FIG. 2A, an arrow 134 indicates the direction in which the reflection peak 130 moves in response to decreases in the refractive index of the adjacent thermo-optical material 80 caused by the heaters 100 and 102. In the current industry jargon, the second Bragg grating 72 is "strengthened" as the reflection peak moves in the direction indicated by the arrow 134 towards a maximum reflectivity, as shown in FIG. 2D. As shown in FIG. 2D, the reflection peak 130 is greater than the on state 126 which indicates that the laser is lasing at a single mode. With the reflection peak 130 associated with the second Bragg grating 72 greater than the on state 126, the laser 10 can be tuned to and hence lase at any cavity mode (not shown) located between 1540 and 1550 nanometers. Further, if necessary, these cavity modes (not shown) can be slightly shifted by the use of the heaters 108 and 110 in the phase control section 20 to align a given cavity mode with the reflection peak 128.

The sum of the wavelength tuning range of the two diffraction gratings exceeds the tuning range of conventional DBR laser, discussed in the background section, without the problems associated with the Variation DBR laser, also discussed in the background section.

Specifically, the total continuous tuning range of the laser 10 is 20 nm which is twice the range obtained from a similar conventional DBR laser with only a single diffraction grating. Further, substantially more than two diffraction gratings can be employed in a laser according to the teachings of this invention thereby further increasing the wavelength tuning range of the resultant laser. This laser, using the thermo-optical material as a tuning mechanism, eliminates the loss associated with tuning semiconductor materials by means of injected current.

Naturally, other variants of the invention are possible. In particular, the thermo-optical material may be replaced with either an electro-optical material or a liquid crystal material. If an electro-optical material were employed, the heaters would be replaced with devices for applying an electric field to the electro-optical material parallel to an electro-optic axis so as to vary the refractive index of the electro-optical material adjacent to the diffraction gratings. Similarly, if a liquid crystal material were employed in place of the thermo-optical material, the heaters would be replaced with devices for applying a voltage across the liquid crystal material so as to vary the refractive index of the liquid crystal material adjacent to the diffraction gratings.

While the invention has been described with respect to the presently preferred embodiments, it will be appreciated by those skilled in the art that modification and changes can be made to the tunable laser of the present invention without departing from its spirit or essential characteristics. Accordingly, all modifications or changes that come within the meaning and range of equivalency of the claims are to be embraced within their scope.

What is claimed is:

1. A wavelength tunable laser comprising:
  a gain means with an active emission section that generates light;
  a waveguide including a core, the core optically coupled to the active emission section for receiving light, the core having a refractive index, the core including more than one diffraction grating, each diffraction grating having a different Bragg wavelength, the core having a diffraction grating-free portion, the diffraction grating-free portion including a phase control section;
  a substrate supporting the waveguide and the gain means;
  thermo-optical material adjacent to each diffraction grating, the refractive index of the thermo-optical material adjacent to each diffraction grating is less than the refractive index of the core; and
  temperature changing means in the thermo-optical material adjacent to each diffraction grating,
  the thermo-optical material positioned in proximity to the phase control section and temperature changing means in the thermo-optical material positioned in proximity to the phase control section, the thermo-optical material being a polymer derived from methacrylate, a polymer derived from siloxane, a polymer derived from carbonate, a polymer derived from styrene, a polymer derived from cyclic olefin, or a polymer derived from norbornene.

2. The laser of claim 1 wherein, when the temperature of the thermo-optical material adjacent each diffraction grating, except for a chosen diffraction grating, is less than an off temperature, the magnitude of the light reflected by each diffraction grating, except for the chosen diffraction grating, is insufficient to cause single mode lasing of the wavelength tunable laser.

3. The laser of claim 2 wherein when the temperature of the thermo-optical material adjacent to the chosen diffraction grating is equal to or greater than the off temperature, the magnitude of the light reflected by the chosen diffraction grating is sufficient to cause single mode lasing of the wavelength tunable laser.

4. The laser of claim 3 wherein the off temperature is in the range of −65° to 100° Celsius.

5. The laser of claim 1 wherein, when the temperature of thermo-optical material adjacent each diffraction grating, except for a chosen diffraction grating, is greater than an off temperature, the magnitude of the light reflected by each diffraction grating, except for the chosen diffraction grating, is insufficient to cause single mode lasing of the wavelength tunable laser.

6. The laser of claim 5 wherein when the temperature of the thermo-optical material adjacent to the chosen diffraction grating is equal to or less than the off temperature, the magnitude of the light reflected by the chosen diffraction grating is sufficient to cause single mode lasing of the wavelength tunable laser.

7. The laser of claim 6 wherein the off temperature is in the range of −65° to 100° Celsius.

8. A wavelength tunable laser comprising:
  a gain means with an active emission section that generates light;
  a waveguide including a core, the core optically coupled to the active emission section for receiving light, the core having a refractive index, the core including more than one diffraction grating, each diffraction grating having a Bragg wavelength, the core having a diffraction grating-free portion, the diffraction grating-free portion including a phase control section;
  a substrate supporting the waveguide and the gain means, the substrate including an index loading region adjacent to each diffraction grating;
  thermo-optical material adjacent to each diffraction grating, the refractive index of the thermo-optical material adjacent to each diffraction grating is less than the refractive index of the core; and
  temperature changing means in the thermo-optical material adjacent to each diffraction grating wherein the product of a pitch associated with each diffraction grating and an effective refractive index of an optical mode as the optical mode propagates by each diffraction grating is different for each diffraction grating,
  the thermo-optical material being positioned in proximity to the phase control section and temperature changing means in the thermo-optical material positioned in proximity to the phase control section, the thermo-optical material being a polymer derived from methacrylate, a polymer derived from siloxane, a polymer derived from carbonate, a polymer derived from styrene, a polymer derived from cyclic olefin, or a polymer derived from norbornene.

9. The laser of claim 8 wherein, when the temperature of the thermo-optical material adjacent to each diffraction gratings, except for a chosen diffraction grating, is less than an off temperature, the magnitude of the light reflected by each diffraction grating, except for the chosen diffraction grating, is insufficient to cause single mode lasing of the wavelength tunable laser.

10. The laser of claim 9 wherein, when the temperature of the thermo-optical material adjacent to the chosen diffraction grating is equal to or greater than the off temperature, the magnitude of the light reflected by the chosen diffraction grating is sufficient to cause single mode lasing of the wavelength tunable laser.

11. The laser of claim 9 wherein the off temperature is in the range of −65° to 100° Celsius.

12. The laser of claim 8 wherein, when the temperature of the thermo-optical material adjacent to each diffraction gratings, except for a chosen diffraction grating, is greater than an off temperature, the magnitude of the light reflected by each diffraction grating, except for the chosen diffraction grating, is insufficient to cause single mode lasing of the wavelength tunable laser.

13. The laser of claim 12 wherein when the temperature of the thermo-optical material adjacent to the chosen diffraction grating is equal to or less than the off temperature, the magnitude of the light reflected by the chosen diffraction grating is sufficient to cause single mode lasing of the wavelength tunable laser.

14. The laser of claim 12 wherein the off temperature is in the range of −65° to 100° Celsius.

15. A wavelength tunable laser comprising:
  a gain means with an active emission section that generates light;
  a waveguide including a core and material within the waveguide, the core optically coupled to the active emission section for receiving light, the core having a refractive index, the core having a diffraction grating-free portion, the diffraction grating-free portion including a phase control section;

regions of gratings in the waveguide, the regions of gratings including thermo-optical material, the refractive index of the thermo-optical material is less than the refractive index of the core;

a substrate supporting the waveguide and the gain means; and temperature changing means in the thermo-optical material, the thermo-optical material being positioned in proximity to the phase control section and temperature changing means in the thermo-optical material positioned in proximity to the phase control section, the thermo-optical material being a polymer derived from methacrylate, a polymer derived from siloxane, a polymer derived from carbonate, a polymer derived from styrene, a polymer derived from cyclic olefin, a polymer derived from norbornene.

16. The laser of claim 15 wherein, when the temperature of the thermo-optical material adjacent each diffraction grating, except for a chosen diffraction grating, is less than an off temperature, the magnitude of the light reflected by each diffraction grating, except for the chosen diffraction grating, is insufficient to cause single mode lasing of the wavelength tunable laser.

17. The laser of claim 16 wherein when the temperature of the thermo-optical material adjacent to the chosen diffraction grating is equal to or greater than the off temperature, the magnitude of the light reflected by the chosen diffraction grating is sufficient to cause single mode lasing of the wavelength tunable laser.

18. The laser of claim 17 wherein the off temperature is in the range of –65° to 100° Celsius.

19. The laser of claim 15 wherein, when the temperature of the thermo-optical material adjacent each diffraction grating, except for a chosen diffraction grating, is greater than an off temperature, the magnitude of the light reflected by each diffraction grating, except for the chosen diffraction grating, is insufficient to cause single mode lasing of the wavelength tunable laser.

20. The laser of claim 19 wherein when the temperature of the thermo-optical material adjacent to the chosen diffraction grating is equal to or less than the off temperature, the magnitude of the light reflected by the chosen diffraction grating is sufficient to cause single mode lasing of the wavelength tunable laser.

21. The laser of claim 20 wherein the off temperature is in the range of –65° to 100° Celsius.

22. A wavelength tunable laser comprising:

a gain means with an active emission section that generates light;

a waveguide including a core and material within the waveguide, the core optically coupled to the active emission section for receiving light, the core having a refractive index, the core having a diffraction grating-free portion, the diffraction grating-free portion including a phase control section;

regions of gratings in the waveguide, the regions of gratings including thermo-optical material, the refractive index of the thermo-optical material is less than the refractive index of the core;

a substrate supporting the waveguide and the gain means, the substrate including an index loading region adjacent to each diffraction grating; and temperature changing means in the thermo-optical material wherein the product of a pitch associated with each diffraction grating and an effective refractive index of an optical mode as the optical mode propagates by each diffraction grating is different for each diffraction grating the thermo-optical material being positioned in proximity to the phase control section and temperature changing means in the thermo-optical material positioned in proximity to the phase control section, the thermo-optical material being a polymer derived from methacrylate, a polymer derived from siloxane, a polymer derived from carbonate, a polymer derived from styrene, a polymer derived from cyclic olefin, or a polymer derived from norbornene.

23. The laser of claim 22 wherein, when the temperature of the thermo-optical material adjacent to each diffraction gratings, except for a chosen diffraction grating, is less than an off temperature, the magnitude of the light reflected by each diffraction grating, except for the chosen diffraction grating, is insufficient to cause single mode lasing of the wavelength tunable laser.

24. The laser of claim 23 wherein, when the temperature of the thermo-optical material adjacent to the chosen diffraction grating is equal to or greater than the of temperature, the magnitude of the light reflected by the chosen diffraction grating is sufficient to cause single mode lasing of the wavelength tunable laser.

25. The laser of claim 23 wherein the off temperature is in the range of –65° to 100° Celsius.

26. The laser of claim 22 wherein, when the temperature of the thermo-optical material adjacent to each diffraction gratings, except for a chosen diffraction grating, is greater than an off temperature, the magnitude of the light reflected by each diffraction grating, except for the chosen diffraction grating, is insufficient to cause single mode lasing of the wavelength tunable laser.

27. The laser of claim 26 wherein when the temperature of the thermo-optical material adjacent to the chosen diffraction grating is equal to or less than the off temperature, the magnitude of the light reflected by the chosen diffraction grating is sufficient to cause single mode lasing of the wavelength tunable laser.

28. The laser of claim 26 wherein the off temperature is in the range of –65° to 100° Celsius.

29. A wavelength tunable filter comprising:

a waveguide including a core, the core having a refractive index, the core including more than one diffraction grating, each diffraction grating having a different Bragg wavelength, the core having a diffraction grating-free portion, the diffraction grating-free portion including a phase control section;

a substrate supporting the waveguide;

thermo-optical material adjacent to each diffraction grating, the refractive index of the thermo-optical material adjacent to each diffraction grating is less than the refractive index of the core; and temperature changing means in the thermo-optical material adjacent to each diffraction grating, the thermo-optical material being positioned in proximity to the phase control section and temperature changing means in the thermo-optical material positioned in proximity to the phase control section, the thermo-optical material being a polymer derived from methacrylate, a polymer derived from siloxane, a polymer derived from carbonate, a polymer derived from styrene, a polymer derived from cyclic olefin, a polymer derived from norbornene.

30. The filter of claim 29 wherein the off temperature is in the range of −65° to 100° Celsius.

31. A wavelength tunable filter comprising:

a waveguide including a core, the core having a refractive index, the core including more than one diffraction grating, each diffraction grating having a Bragg wavelength, the core having a diffraction grating-free portion, the diffraction grating-free portion including a phase control section;

a substrate supporting the waveguide, the substrate including an index loading region adjacent to each diffraction grating;

thermo-optical material adjacent to each diffraction grating, the refractive index of the thermo-optical material adjacent to each diffraction grating is less than the refractive index of the core; and temperature changing means in the thermo-optical material adjacent to each diffraction grating wherein the product of a pitch associated with each diffraction grating and an effective refractive index of an optical mode as the optical mode propagates by each diffraction grating is different for each diffraction grating the thermo-optical material being positioned in proximity to the phase control section and temperature changing means in the thermo-optical material positioned in proximity to the phase control section, the thermo-optical material being a polymer derived from methacrylate, a polymer derived from siloxane, a polymer derived from carbonate, a polymer derived from styrene, a polymer derived from cyclic olefin, or a polymer derived from norbornene.

32. The filter of claim 31 wherein the off temperature is in the range of −65° to 100° Celsius.

33. A wavelength tunable filter comprising:

a waveguide including a core and material within the waveguide, the core optically coupled to an active emission section for receiving light, the core having a refractive index, the core having a diffraction grating-free portion, the diffraction grating-free portion including a phase control section;

regions of gratings in the waveguide, the regions of gratings including thermo-optical material, the refractive index of the thermo-optical material is less than the refractive index of the core;

a substrate supporting the waveguide; and temperature changing means in the thermo-optical material, the thermo-optical material being positioned in proximity to the phase control section and temperature changing means in the thermo-optical material positioned in proximity to the phase control section, the thermo-optical material being a polymer derived from methacrylate, a polymer derived from siloxane, a polymer derived from carbonate, a polymer derived from styrene, a polymer derived from cyclic olefin, or a polymer derived from norbornene.

34. The filter of claim 33 wherein the off temperature is in the range of −65° to 100° Celsius.

35. A wavelength tunable filter comprising:

a waveguide including a core and material within the waveguide, the core optically coupled to an active emission section for receiving light, the core having a refractive index, the core having a diffraction grating-free portion, the diffraction grating-free portion including a phase control section;

regions of gratings in the waveguide, the regions of gratings including thermo-optical material, the refractive index of the thermo-optical material is less than the refractive index of the core;

a substrate supporting the waveguide, the substrate including an index loading region adjacent to each diffraction grating; and temperature changing means in the thermo-optical material wherein the product of a pitch associated with each diffraction grating and an effective refractive index of an optical mode as the optical mode propagates by each diffraction grating is different for each diffraction grating the thermo-optical material being positioned in proximity to the phase control section and the temperature changing means in the thermo-optical material positioned in proximity to the phase control section, the thermo-optical material being a polymer derived from methacrylate, a polymer derived from siloxane, a polymer derived from carbonate, a polymer derived from styrene, a polymer derived from cyclic olefin, or a polymer derived from norbornene.

36. The filter of claim 35 wherein the off temperature is in the range of −62° to 100° Celsius.

* * * * *

UNITED STATES PATENT AND TRADEMARK OFFICE
CERTIFICATE OF CORRECTION

PATENT NO. : 6,782,164 B1
DATED : August 24, 2004
INVENTOR(S) : Lee et al.

It is certified that error appears in the above-identified patent and that said Letters Patent is hereby corrected as shown below:

Column 15,
Line 17, after "olefin,", insert -- or --.

Column 16,
Line 23, delete "of" and insert -- off --.
Line 66, after "olefin,", insert -- or --.

Column 17,
Line 22, after "grating", insert -- , --.

Signed and Sealed this

Fourteenth Day of December, 2004

JON W. DUDAS
*Director of the United States Patent and Trademark Office*